US006988566B2

(12) United States Patent
Lockerd, Sr. et al.

(10) Patent No.: US 6,988,566 B2
(45) Date of Patent: Jan. 24, 2006

(54) ACOUSTIC POSITION MEASUREMENT SYSTEM FOR WELL BORE FORMATION

(75) Inventors: Robert Michael Lockerd, Sr., Dallas, TX (US); Joseph A. Zupanick, Pineville, WV (US); Monty H. Rial, Dallas, TX (US)

(73) Assignee: CDX Gas, LLC, Dallas, TX (US)

( * ) Notice: Subject to any disclaimer, the term of this patent is extended or adjusted under 35 U.S.C. 154(b) by 0 days.

(21) Appl. No.: 10/079,794

(22) Filed: Feb. 19, 2002

(65) Prior Publication Data

US 2005/0161258 A1 Jul. 28, 2005

(51) Int. Cl.
*E21B 47/02* (2006.01)
*E21B 49/00* (2006.01)
(52) U.S. Cl. .......................... 175/45; 175/62; 175/73; 367/123; 340/853.6; 340/853.8
(58) Field of Classification Search ................. 175/40, 175/41, 45, 49, 50, 61, 62, 73, 92; 340/853.1, 340/853.3, 853.6, 853.8, 856.4; 367/123, 367/125, 40, 48; 181/102, 106, 112
See application file for complete search history.

(56) References Cited

U.S. PATENT DOCUMENTS

| | | | |
|---|---|---|---|
| 3,828,867 A | 8/1974 | Elwood | 175/45 |
| 3,967,201 A | 6/1976 | Rorden | 325/28 |
| 4,244,037 A | 1/1981 | Jelks | 367/121 |
| 4,282,588 A | 8/1981 | Chanson et al. | 367/82 |
| 4,323,848 A | 4/1982 | Kuckes | |
| 4,372,398 A | 2/1983 | Kuckes | 175/45 |
| 4,391,336 A * | 7/1983 | Coon et al. | 175/45 |
| 4,443,762 A | 4/1984 | Kuckes | |
| 4,529,939 A | 7/1985 | Kuckes | |
| 4,641,289 A | 2/1987 | Jürgens | 367/85 |
| 4,686,657 A * | 8/1987 | Dellinger et al. | 367/75 |
| 4,700,142 A | 10/1987 | Kuckes | |
| 4,768,615 A * | 9/1988 | Steinebrunner et al. | |
| 4,791,373 A | 12/1988 | Kuckes | |
| 4,845,434 A | 7/1989 | Kuckes et al. | |
| 4,850,450 A * | 7/1989 | Hoyle et al. | |
| 4,933,640 A | 6/1990 | Kuckes | |
| 5,074,365 A | 12/1991 | Kuckes | 175/40 |

(Continued)

FOREIGN PATENT DOCUMENTS

CA 1174276 9/1984

(Continued)

OTHER PUBLICATIONS

International Search Report for PCT/US03/04936, 7 pages, Jul. 25, 2003.

*Primary Examiner*—Frank S. Tsay
*Assistant Examiner*—Daniel P Stephenson
(74) *Attorney, Agent, or Firm*—Fish & Richardson P.C.

(57) ABSTRACT

An acoustic position measurement system and method includes an acoustic transmitter operable to transmit a sound wave into an underground well bore in a target formation. The sound wave is configured to reflect from a boundary formation proximate the target formation. The system includes an acoustic receiver operable to receive a reflected sound wave. The reflected sound wave comprises a reflection of the sound wave from the boundary formation. The system also includes an electronics portion electrically coupled to the acoustic receiver. The electronics portion is operable to process the reflected sound wave and produce, based upon a characteristic of the reflected sound wave, data output indicative of a position of the acoustic position measurement system in the target formation.

18 Claims, 2 Drawing Sheets

U.S. PATENT DOCUMENTS

| | | | | |
|---|---|---|---|---|
| 5,115,871 | A | 5/1992 | McCann et al. | 175/50 |
| 5,218,301 | A | 6/1993 | Kuckes | |
| 5,240,350 | A | 8/1993 | Yamaguchi et al. | 405/143 |
| 5,258,755 | A | 11/1993 | Kuckes | |
| 5,305,212 | A | 4/1994 | Kuckes | |
| 5,341,886 | A | 8/1994 | Patton | 175/24 |
| 5,343,152 | A | 8/1994 | Kuckes | |
| 5,394,950 | A | 3/1995 | Gardes | |
| 5,469,155 | A | 11/1995 | Archambeault et al. | 340/853.4 |
| 5,485,089 | A | 1/1996 | Kuckes | 324/346 |
| 5,512,830 | A | 4/1996 | Kuckes | |
| 5,513,710 | A | 5/1996 | Kuckes | |
| 5,515,931 | A | 5/1996 | Kuckes | |
| 5,589,775 | A | 12/1996 | Kuckes | |
| 5,657,826 | A | 8/1997 | Kuckes | |
| 5,676,212 | A | 10/1997 | Kuckes | |
| 5,678,643 | A | 10/1997 | Robbins et al. | 175/45 |
| 5,725,059 | A | 3/1998 | Kuckes et al. | |
| 5,728,978 | A | 3/1998 | Roberts et al. | 181/102 |
| 5,796,677 | A * | 8/1998 | Kostek et al. | |
| 5,852,587 | A * | 12/1998 | Kostek et al. | |
| 5,917,325 | A | 6/1999 | Smith | 324/326 |
| 5,923,170 | A | 7/1999 | Kuckes | |
| 5,934,371 | A | 8/1999 | Bussear et al. | 166/53 |
| 5,975,204 | A | 11/1999 | Tubel et al. | 166/250.15 |
| RE36,569 | E | 2/2000 | Kuckes | |
| 6,026,913 | A | 2/2000 | Mandal et al. | 175/45 |
| 6,026,914 | A | 2/2000 | Adams et al. | 175/45 |
| 6,026,915 | A | 2/2000 | Smith et al. | 175/50 |
| 6,116,344 | A | 9/2000 | Longbottom et al. | 166/298 |
| 6,137,747 | A | 10/2000 | Shah et al. | 367/81 |
| 6,206,108 | B1 | 3/2001 | MacDonald et al. | 175/24 |
| 6,234,259 | B1 | 5/2001 | Kuckes et al. | |
| 6,466,020 | B2 | 10/2002 | Kuckes et al. | |
| 6,736,222 | B2 | 5/2004 | Kuckes et al. | |
| 2002/0030398 | A1 * | 3/2002 | Drake et al. | 299/8 |
| 2002/0105858 | A1 | 8/2002 | Winnacker | |

FOREIGN PATENT DOCUMENTS

| | | |
|---|---|---|
| CA | 1175106 | 9/1984 |
| CA | 1186733 | 5/1985 |
| CA | 2157824 | 5/2000 |
| GB | 2 100 442 A | 12/1982 |
| GB | 2 114 752 A | 8/1983 |
| WO | WO 2004/055325 A1 | 7/2004 |

* cited by examiner

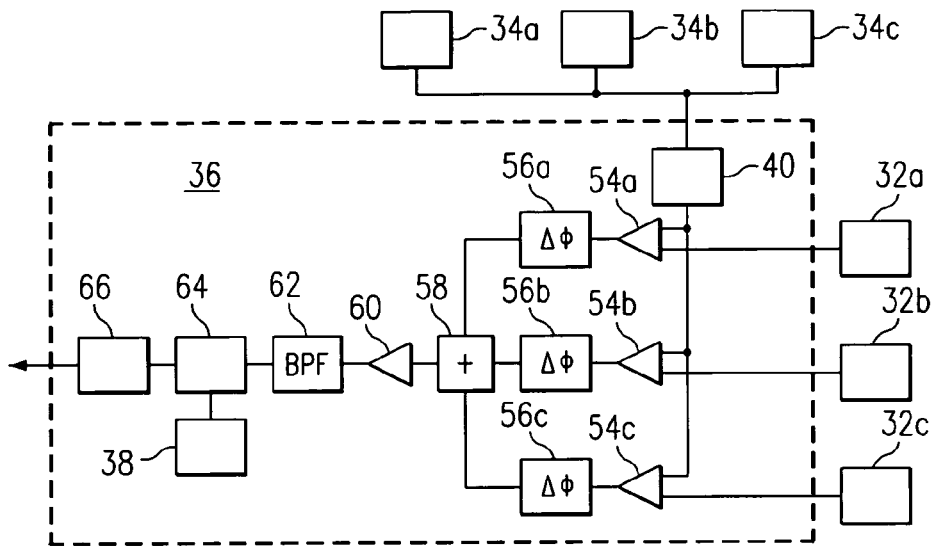
FIG. 3
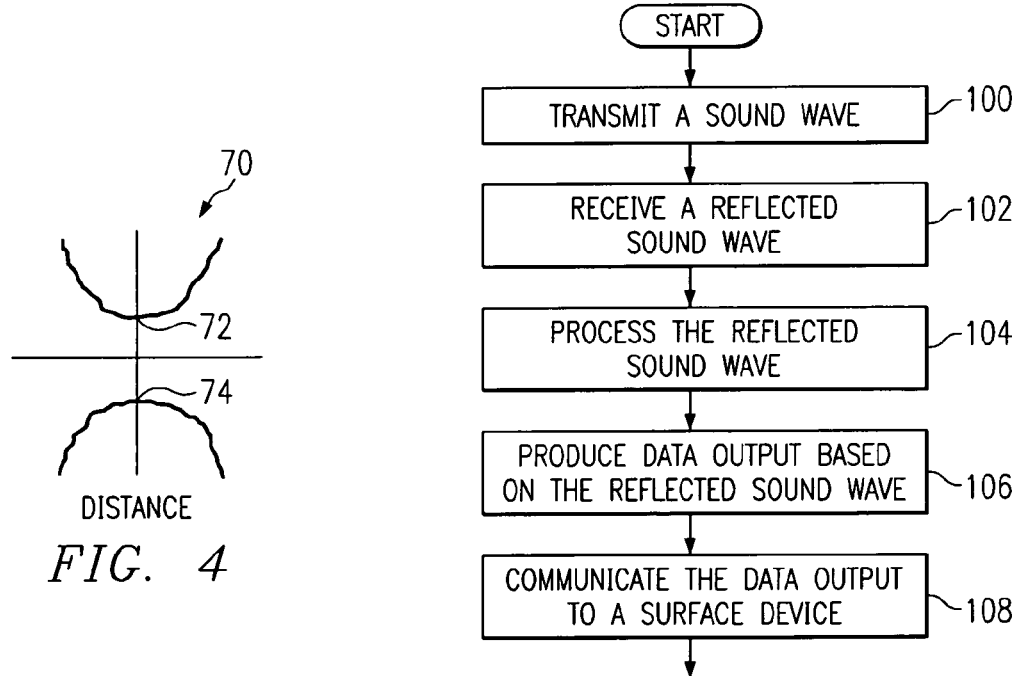
FIG. 4
FIG. 5

ACOUSTIC POSITION MEASUREMENT SYSTEM FOR WELL BORE FORMATION

TECHNICAL FIELD OF THE INVENTION

This invention relates in general to the field of well bore formation and, more particularly, to an acoustic position measurement system used in well bore formation.

BACKGROUND OF THE INVENTION

The formation of subterranean well bores is required in various industries, such as mining, liquid and gaseous hydrocarbon extraction, water extraction and exploration for various other types of mineral resources or subterranean structural features.

At any point in the drilling of a well bore its desired orientation may be vertical, horizontal or at any other orientation to achieve the positioning of the bore required by the incident application. Further, the incident application may require that the well bore remain within and/or aligned with one or more boundaries of a specific "target" geologic formation such as a stratum, seam or other delimited subterranean structure. In these cases, it is necessary to detect and measure the distance to the boundaries between the target formation and the adjacent formation(s) to allow guidance of the drilling process to keep the well bore within the target formation.

Well bores are typically formed by a drilling rig that rotates a drill string and thus a drill bit at the distal end of the drill string; or which rotates the drill string only to alter the direction of drilling, and the drill bit may in those cases be powered by, for example, a hydraulic or electric powered motor section located at or near the end of the drill string. The drill string may also include a bent section to facilitate steering and/or other rotation of the drill bit.

SUMMARY OF THE INVENTION

The present invention provides an acoustic position measurement system used in well bore formation that substantially eliminates or reduces at least some of the disadvantages and problems associated with previous systems used in position measurement systems for well bore formation.

In accordance with a particular embodiment of the present invention, an acoustic position measurement system includes an acoustic transmitter operable to transmit a sound wave into an underground well bore in a target formation. The sound wave is configured to reflect back, in part, from a boundary formation proximate the target formation. The reflected sound wave comprises a reflection of the sound wave from the boundary formation. The system includes an acoustic receiver operable to receive the reflected sound wave. The system also includes an electronics portion electrically coupled to the acoustic receiver. The electronics portion is operable to process the reflected sound wave and produce, based upon one or more characteristics of the reflected sound wave, data output indicative of the position of the acoustic position measurement system relative to a boundary of the target formation.

In accordance with another embodiment, a method for determining a desired position for a drilling member using an acoustic position measurement system comprises transmitting a sound wave into an underground well bore in a target formation using an acoustic transmitter. The sound wave reflects from a boundary formation proximate the target formation. The method includes receiving a reflected sound wave from within the well bore using an acoustic receiver. The reflected sound wave comprises a reflection of the sound wave from the boundary formation. The method also includes processing the reflected sound wave using an electronics portion coupled to the acoustic receiver and producing data output based upon a characteristic of the reflected sound wave using the electronics portion. The data output is indicative of a position of the acoustic position measurement system in the target formation.

Technical advantages of particular embodiments of the present invention include an acoustic position measurement system for well bore formation which utilizes acoustic technology to send and receive sound waves in order to determine the position of a drill bit within a target formation during formation of a well bore. As a result, a horizontal or other elongated bore may be maintained within a target formation and penetration into neighboring formations may be avoided. Accordingly, time and expense associated with forming the well bore may be reduced. Further, the ability of the well bore to produce the desired extraction of the desired materials may be materially enhanced by deliberately positioning it within favorable portions of the target formation.

Another technical advantage of particular embodiments of the present invention includes an acoustic position measurement system for well bore formation which may process the received sound waves underground to determine the position of the system within a target formation. In this embodiment, the position measurement system may determine and communicate the relative position of the drilling system to the surface or may communicate an alarm if the position of the system is less than a specified distance to a boundary. Thus, additional components and resources are not needed on the surface to process the received sound waves and low bandwidth links may be used to communicate with the surface.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the particular embodiments of the invention and their advantages, reference is now made to the following descriptions, taken in conjunction with the accompanying drawings, in which:

FIG. 3 illustrates an electronics package of an acoustic position measurement system, in accordance with an embodiment of the present invention;

FIG. 4 illustrates a polar distance map of an acoustic position measurement system, in accordance with an embodiment of the present invention; and FIG. 5 illustrates an example method for determining a desired position for a drilling member using an acoustic position measurement system, in accordance with an embodiment of the present invention.

DETAILED DESCRIPTION OF THE INVENTION

Figure 1:
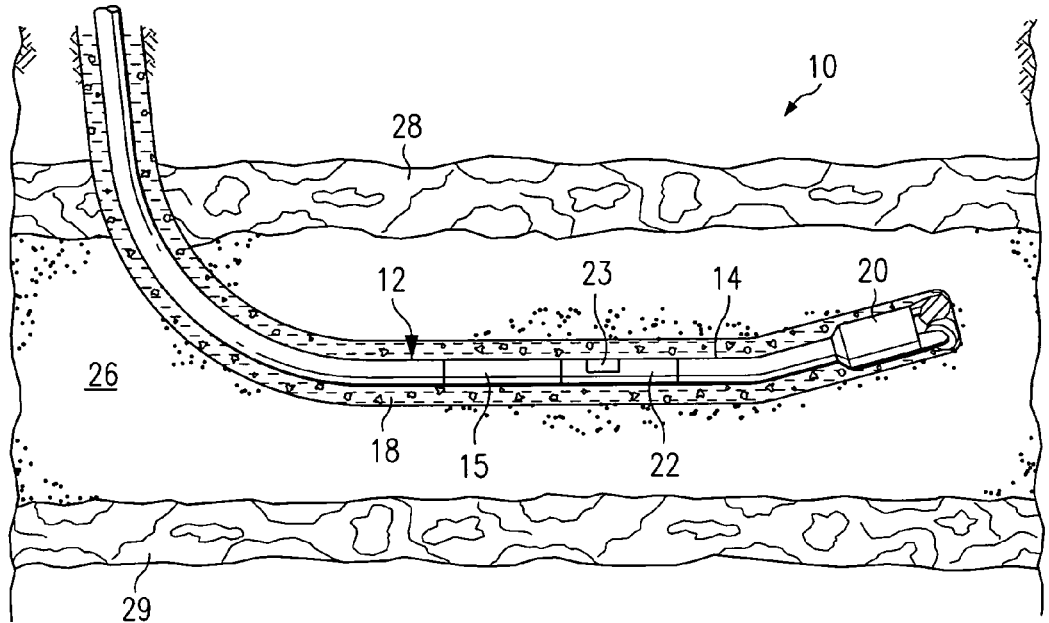
FIG. 1 illustrates a system for guided drilling of a coal seam or other target formation, in accordance with an embodiment of the present invention.

FIG. 1 illustrates a system 10 for guided drilling in a bounded geologic formation and other suitable formations in accordance with a particular embodiment of the present invention. In this embodiment, the formation is a coal seam having a thickness of less than ten feet. It may be understood that the present invention may be used in connection with drilling other suitable formations, other suitable inclinations and/or formations of other suitable thicknesses.

System 10 comprises a rotary or other suitable drilling rig at the surface and a drill string 12 extending from the drilling rig. The drilling rig rotates and otherwise controls drill string 12 to form a well bore 18. In one embodiment, drill string 12 includes a rotary cone drill bit 20, which cuts through an underground coal seam 26 to form well bore 18 when drill string 12 is rotated. The desired orientation of the well bore is generally parallel to boundaries of the formation being drilled. Drill string 12 includes a bent sub/motor section 14, which rotates drill bit 20 when drilling fluid is circulated. Drilling fluid is pumped down drill string 12 and discharged out of nozzles in drill bit 20. The drilling fluid powers the motor and lubricates drill bit 20, removes formation cuttings and provides a hydrostatic head of pressure in well bore 18.

Drill string 12 also includes a sensor section 22 and a transmitter section 15, which may include various electronic devices, which may aid in drilling. In a particular embodiment, the sensor section includes a measurement while drilling (MWD) device, one or more logging tools and an acoustic position measurement system 23. Sensor section 22 and transmitter section 15 may be powered by one or more local battery cells or generated power or by a wireline from the surface. Sensor section 22 and transmitter section 15 and their components may communicate with the surface through suitable wireline and/or wireless links, such as, for example, mud pulses or radio frequency. Transmitter section 15 may communicate information to the surface that is compiled, produced or processed by sensor section 22. In particular embodiments, sensor section 22 may be operable to communicate such information to the surface.

In the illustrated embodiment, well bore 18 is drilled in a coal seam 26. Coal seam 26 is bounded by an upper boundary layer 28 and a lower boundary layer 29. The upper and lower boundary layers 28 and 29 may be sandstone, shale, limestone or other suitable rock and/or mineral strata.

Figure 2:
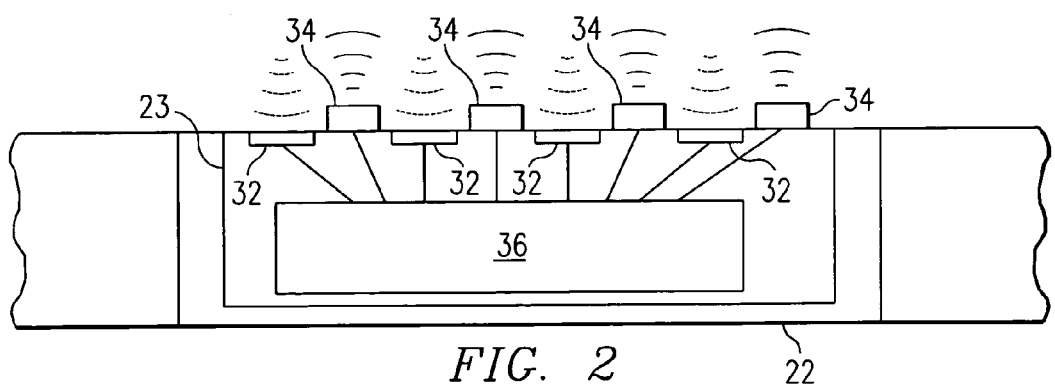
FIG. 2 illustrates an acoustic position measurement system with acoustic transmitters and receivers, in accordance with an embodiment of the present invention.

FIG. 2 illustrates details of acoustic position measurement system 23 of sensor section 22 in accordance with a particular embodiment of the present invention. As described in more detail below, acoustic position measurement system 23 provides positional feedback so that an operator or an automated drill guidance system may maintain drill string 12 in a desired position within coal seam 26 and/or to prevent drill string 12 from leaving coal seam 26.

Referring to FIG. 2, acoustic position measurement system 23 includes acoustic transmitters 34, acoustic transducer receivers 32 and electronics package 36. Transmitters 34 may be mounted and/or located upon sensor section 22 in various ways. For example, in particular embodiments transmitters 34 may be flush-mounted upon sensor section 22. Transmitters 34 may also be aligned in a row upon sensor section 22, as illustrated, or may be spaced in line or staggered about the circumference of sensor section 22. Transmitters 34 are operable to transmit a sound wave into the wall of the well bore surrounding sensor section 22. Transmitters 34 may transmit the sound wave each second, every few seconds or multiple times per second. If drill string 12 is rotated between successive transmissions of a sound wave, the sound wave will ultimately propagate in directions all around sensor section 22 (360 degrees around acoustic position measurement system 23). The interval at which the sound waves are transmitted may depend on the speed of rotation of drill string 12. The frequency of the sound wave transmitted by transmitters 34 may be similar to frequencies used in sonic well logging. As an example, sound waves having frequencies ranging between 1.0 hertz and 2.0 megahertz may be used. The sound wave should be discernable in a drilling environment, should propagate well in the formations and should provide a maximum or suitable amplitude reflected signal at the boundary layer. In applications where high resolution is important, higher frequencies may be used. In some embodiments, the transmitters may transmit a sound wave using mechanical means. As used herein, the term "sound wave" may include either one or a plurality of sound waves.

Receivers 32 of acoustic position measurement system 23 are flush-mounted upon sensor section 30 in the illustrated embodiment, but other embodiments may include receivers 32 mounted and/or located upon sensor section 30 in other ways. Receivers 32 may be aligned in a row as discussed earlier with regard to transmitters 34 so as to receive the reflected sound wave from all directions around acoustic position measurement system 23 during rotation of drill string 12. In particular embodiments, the spacing between each receiver 32 may be some fraction or multiple of a wavelength of the sound wave being generated by transmitters 34 (e.g., one-half of such wavelength). Receivers 32 of acoustic position measurement system 23 may be conventionally combined with transmitters 34 in some embodiments, using piezoelectrics or other suitable techniques. The sound wave transmitted by transmitters 34 reflects from boundaries of the coal seam or other target formation (for example, upper and lower boundaries 28 and 29 of coal seam 26 of FIG. 1), and receivers 32 receive the reflected sound waves from within well bore 18.

Each receiver 32 and transmitter 34 are electrically coupled to an electronics package 36. As used herein, "each" means any one of at least a sub-set of items. Electronics package 36 controls transmitters 34 to transmit acoustic signals in well bore 18 and processes reflected or return signals to provide positional information of the system in the well bore. In one embodiment, the positional information may be the distance between the acoustic position measurement system 23 and a boundary, such as upper boundary 28 or lower boundary 29 of coal seam 26 of FIG. 1 as discussed in further detail below. In another embodiment, the positional information may be whether the system is within a specified range of a boundary, such as one or two feet.

Electronics package 36 may use a combination of analog signal amplification and filtering, and digital signal processing (DSP) or other techniques to make such a determination. Thus, electronics package 36 may comprise logic encoded in media, such as programmed tasks for carrying out programmed instructions. The media may be a storage medium, a general-purpose processor, a digital signal processor, ASIC, FPGA or the like. Electronics package 36 may also calculate or process other data, which may help in determining the distance of acoustic position measurement system 23 to a particular boundary. Electronics package 36 may also transmit raw data to the surface for processing.

FIG. 3 illustrates an electronics package 36 for processing a reflected sound wave in accordance with a particular embodiment of the present invention. Electronics package 36 includes amplifiers 54, phase shifters 56, combiner 58, amplifier 60, band pass filter 62, directional sensor 38, timer 40, processor 64 and communication port 66.

Receivers 32 receive the reflected sound wave along with other acoustic noise present in the well bore 18. The combined reflected sound wave plus any received acoustic noise is amplified by amplifiers 54 and passes to phase shifters 56. Phase shifters 56 induce a known amount of phase shift into the sound waves received by receivers 32. This process can help maximize the reception for a desired signal and can reduce the reception for undesired noise received by receivers 32.

As an example, a sound wave reflected from a boundary 28 or 29 of coal seam 26 of FIG. 1 may arrive at each receiver 32 at a different phase angle of the primary sinusoidal component of the received sound wave. When the reflected sound wave arrives at receiver 32a, the primary sinusoidal component of the wave may be at a different phase than when it arrives at receiver 32b (and likewise with respect to receiver 32c). As a result, phase shifters 56 can induce a known amount of phase shift into the primary sinusoidal component of the wave received by their respective receivers in order to bring all the reflected sound waves into the same phase angle.

Phase shifter 56a may induce a certain amount of phase shift into the primary sinusoidal component of the desired sound wave received by receiver 32a, while phase shifter 56b may induce a different amount of phase shift into the primary sinusoidal component of the sound wave received by receiver 32b to bring the sound waves received by receivers 32a and 32b into the same phase. Accordingly, phase shifter 56c may induce a different amount of phase shift into the primary sinusoidal component of the sound wave received by receiver 32c to bring the primary sinusoidal component of the wave into phase with the primary sinusoidal component of the sound waves shifted by phase shifters 56a and 56b. The difference in the amounts of phase shift induced by phase shifters 56 may be relative to the distance between their respective receivers 32 of acoustic position measurement system 23. The phase shift inducement can increase the reception of the primary sinusoidal component of the reflected sound wave since the wave received by each receiver will now be in phase with the wave received by the other receivers, thus increasing the amplitude of the sum of the primary sinusoidal components of the reflected sound wave. It should be understood that it may not be necessary for one or more phase shifters 56 to induce a phase shift into a reflected sound wave received by their respective receivers 32 in order to bring each primary sinusoidal component of the received wave into the same phase.

Combiner 58 combines the sound waves plus noise received by each respective receiver into one signal after such waves plus noise have passed through amplifiers 54 and phase shifters 56. The combined signal is then amplified by amplifier 60. Band-pass filter (BPF) 62 filters out undesired frequencies and/or noise picked up by receivers 32. Such undesired frequencies are typically all frequencies other than the frequency of the primary sinusoidal component of the sound waves transmitted by transmitters 34. BPF 62 may be set so that it only passes through this certain desired frequency and attenuates all others to the maximum extent possible.

Other techniques or devices may also be used to reduce or filter out undesired noise received by receivers 32. For example, the function of the BPF may, instead, be implemented by digitizing the signal in an analog-to-digital converter, and then digitally filtering the resulting data stream by well-known means in a digital signal processor. For another example, the rotation of the drill string may be reduced or stopped while the measurement system is in operation in order to reduce undesired noise in the well bore. The drill bit may also be backed away from the surface being drilled. Furthermore, the circulation of drilling fluid may be reduced or stopped to reduce undesired acoustic noise.

After the signal has passed through BPF 62, a processor 64 of the electronics package calculates the distance from acoustic position measurement system 23 to the boundary of the target formation (e.g., boundary 28 of coal seam 26 of FIG. 1) based upon the amount of time it took between transmission of the sound wave and the reception of the reflected sound wave received by receivers 32. Such distance is a product of one-half such amount of time and the average acoustic propagation velocity of the subterranean material through which the transmitted and reflected sound waves have traveled.

The amplitude of the reflected sound wave received by receivers 32 is, in part, a function of the acoustic attenuation properties of the materials through with the sound wave passes and of the boundary formation from which the sound wave reflects. In addition, the portion of the transmitted energy reflected at the formation boundary is a direct function of the difference in densities between the target formation and the adjacent formation that forms the boundary formation. For example, the density of material immediately forming the boundaries of a coal seam (i.e., shale, sandstone, limestone, etc.) may be approximately 2.6 to 2.8 times the density of water, while the density within the coal seam may be approximately 1.4 times the density of water. This may result in a density ratio between those two areas of approximately 2:1.

Any acoustic properties of these materials which change with acoustic frequency may also be helpful in choosing the frequency of the sound wave to be transmitted by the transmitters of the acoustic position measurement system. The choice of such frequency may, for example, be based on minimizing the acoustic attenuation of the primary sinusoidal component of the sound waves transmitted by transmitters 34.

Directional sensor 38 determines a directional reference position for acoustic position measurement system 23. This determination may, for example, be the rotational position (in terms of degrees measured from the local gravitational vertical) of acoustic position measurement system 23 or receivers 32 at a particular time. Directional sensor 38 also may determine other directional positions, such as the inclination of acoustic position measurement system 23 in other embodiments. This information, combined with the distance information determined by electronics package 36 may be communicated to an operator at the surface. Such communication may be made using a wireline, a mud pulse, an electromagnetic pulse or other techniques known by one skilled in the art. Such communication may also be made by a separate transmitter section 15, as illustrated in FIG. 1. In some embodiments, directional sensor 38 may be included in a section of drill string 12 separate from sensor section 22.

Timer 40 can activate and deactivate transmitters 34 and amplifiers 54 at a particular time to minimize the reception of acoustic noise or false signals, and/or to avoid possible electrical saturation or burnout of transmitters 34, amplifiers 54 and other components of electronics portion 36. For example, timer 40 may deactivate amplifiers 54 during and shortly after a time window when a sound wave is being transmitted. Subsequently, amplifiers 54 may be activated during a window in which the sound wave is expected to be received after being reflected from boundaries 28 or 29 of coal seam 26 of FIG. 1. This process can reduce the potential to amplify and process reflections of the sound wave from other surrounding strata and can also reduce the possibility of electrical saturation and/or burnout of amplifiers 54 and other components of electronics portion 36 resulting from amplifying and processing undesired sound waves or noise from within the well bore.

The distance information produced by processor 64 is combined by processor 64 with directional information produced by directional sensor 38. Such information may be communicated to an operator or to an automated drill guidance system through communication port 66. The information may enable an operator or an automated drill guidance system to keep the drill string at a desired relative position within the target formation. For example, if the operator or automated drill guidance system receives distance and directional information indicating that the drill string is getting closer than desired to a boundary of the target formation, the operator or automated drill guidance system may guide the drill string in another direction to keep it centralized within the target formation.

Distance and directional information may be displayed to an operator at the surface in any of a number of ways. One example of such a display is an analog display showing two numbers—one number representing the rotation position of receivers 32 of acoustic position measurement system 23 and another number representing the distance from receivers 32 at such rotational position to a target formation boundary. An operator can use this information to steer the drilling member in order to maintain a centralized position within the coal seam. The orientation information (i.e. rotation and inclination position) of the acoustic position measurement system may be combined with the distance information and the distance between the acoustic position measurement system and the drill bit to determine how far the drill bit is from a particular boundary of the coal seam. Electronics package 36 may also send a signal to the surface when the acoustic position measurement system is within a certain range of a boundary of a coal seam. Electronics package 36 may also determine and indicate which boundary formation the acoustic position measurement system is being approached.

The directional and distance information may also be used to chart a polar distance map of the surrounding strata. FIG. 4 illustrates a polar distance map 70 in accordance with a particular embodiment of the present invention. Electronics package 36 or another device may also be able to chart such a map based on the distance information provided by electronics package 36 and the directional information provided by directional sensor 38. The polar distance map may be continuously updated in real-time and may be charted below the surface. It may be displayed on a visual display at the surface, such as a computer display.

Referring to FIG. 4, polar distance map 70 shows the distance from the acoustic position measurement system of the drill string to a point of closest approach (PCA) 72 of the target formation boundary in one direction and to a PCA 74 of the target formation boundary in an opposite direction. If it is desired to maintain a centralized position within the target formation with respect to the directions upon which polar distance map 70 is based, an operator or automated drill guidance system would want polar distance map 70 to appear symmetrical (e.g., approximately equal distance to PCA 72 and to PCA 74), as illustrated. If a polar distance map shows that the distance to one PCA is less than the distance to another PCA, the operator or automated drill guidance system can steer the drill string away from the direction represented by PCA closer to the drill string in order to centrally position the drill string within the coal seam.

FIG. 5 illustrates an example method for determining a desired position for a drilling member using an acoustic position measurement system, in accordance with an embodiment of the present invention. The method begins at step 100 where a sound wave is transmitted in a target formation, such as a coal seam, using an acoustic transmitter. The sound wave reflects from a boundary formation proximate the target formation, such as boundary layers 28 and 29 of FIG. 1. Particular embodiments may include transmitting a plurality of sound waves using a plurality of acoustic transmitters. Step 102 includes receiving a reflected sound wave using an acoustic receiver. The reflected sound wave may comprise a reflection of the sound wave transmitted in step 100 from the boundary formation. Particular embodiments may include receiving a plurality of reflected sound waves using a plurality of acoustic receivers.

Step 104 includes processing the reflected sound wave using an electronics portion coupled to the acoustic receiver. Such processing may comprise amplifying the reflected sound wave using an amplifier coupled to the acoustic receiver. The function of the amplifier may be changed by a timer at specified times and for specified durations after transmission of the sound wave to prevent amplifier saturation by the transmitted wave and "near field" returns, and to otherwise reduce the acoustic noise energy input to the amplifier. In particular embodiments where a plurality of reflected sound waves are received using a plurality of acoustic receivers, the method may include shifting the phase of the primary sinusoidal component of at least one of the reflected sound waves using the electronics portion to bring the primary sinusoidal component of each reflected sound wave into alignment with respect to the primary sinusoidal component of the other reflected sound waves. Such phase shifting may be accomplished using one or more phase shifters of the electronics portion. In some embodiments, the reflected sound waves may be combined to generate a signal. The signal may also be filtered before and/or after amplification using a band-pass filter, digital signal processing and/or other methods to minimize the reception of out-of-band acoustic noise energy.

Step 106 includes producing data output based on the reflected sound wave. The data output may be indicative of a position of the acoustic position measurement system in the target formation, such as the distance from the acoustic position measurement system to the boundary formation. Particular embodiments may include detecting a directional position of the system using a directional sensor. In such cases, the data output may comprise the directional position and a distance from the system to the boundary formation. Step 108 includes communicating the data output to a surface device. Such communication may be made through suitable wireline and/or wireless links, such as drilling fluid pressure pulses or electromagnetic transmissions.

Although the present invention has been described in detail, various changes and modifications may be suggested to one skilled in the art. It is intended that the present invention encompass such changes and modifications as falling within the scope of the appended claims.

What is claimed is:

1. An acoustic position measurement system comprising:
   an acoustic transmitter operable to transmit a sound wave into an underground well bore in a target formation, the sound wave configured to reflect from a boundary formation proximate the target formation;

an acoustic receiver operable to receive a reflected sound wave, the reflected sound wave comprising a reflection of the sound wave from the boundary formation;

an electronics portion electrically coupled to the acoustic receiver, the electronics portion operable to:

process the reflected sound wave; and produce, based upon a characteristic of the reflected sound wave, data output indicative of a position of the acoustic position measurement system in the target formation; and a plurality of acoustic receivers operable to receive a plurality of reflected sound waves, wherein the plurality of acoustic receivers are coupled to the electronics portion, and wherein the electronics portion is further operable to:

shift the phase of the primary sinusoidal component of at least one of the reflected sound waves to bring the primary sinusoidal component of each reflected sound wave into alignment with respect to the primary sinusoidal component of the other reflected sound waves; and produce the data output based on the reflected sound waves.

2. The acoustic position measurement system of claim 1, wherein the data output comprises a distance from the acoustic position measurement system to the boundary formation.

3. The acoustic position measurement system of claim 1, the electronics portion further comprising a transmitter operable to communicate the data output to a surface device.

4. The acoustic position measurement system of claim 1, wherein the electronics portion comprises an amplifier and processing the reflected sound wave comprises amplifying the reflected sound wave.

5. The acoustic position measurement system of claim 4, further comprising a timer operable to activate the amplifier for the receiver at a specified time after transmission of the sound wave and for a specified duration.

6. The acoustic position measurement system of claim 1, further comprising a combiner operable to combine the reflected sound waves to generate a signal, and wherein the data output is based on the signal.

7. The acoustic position measurement system of claim 6, further comprising a band pass filter operable to filter the signal to block out-of-band sound waves.

8. The acoustic position measurement system of claim 1, further comprising a directional sensor operable to detect a directional position of the acoustic position measurement system, wherein the data output comprises the directional position, a distance from the acoustic position measurement system to the boundary formation and an indication if the system is within a specified range of the boundary formation.

9. The acoustic positioning measurement system of claim 1, wherein a density ratio between the boundary formation and the target formation is approximately 2:1.

10. A method for determining a desired position for a drilling member using an acoustic position measurement system, comprising:

transmitting a sound wave into an underground well bore in a target formation using an acoustic transmitter, wherein the sound wave reflects from a boundary formation proximate the target formation;

receiving a reflected sound wave from within the well bore using an acoustic receiver, wherein the reflected sound wave comprises a reflection of the sound wave from the boundary formation;

processing the reflected sound wave using an electronics portion coupled to the acoustic receiver;

producing data output based upon a characteristic of the reflected sound wave using the electronics portion, the data output indicative of a position of the acoustic position measurement system in the target formation;

receiving a plurality of reflected sound waves using a plurality of acoustic receivers;

shifting the phase of the primary sinusoidal component of at least one of the reflected sound waves using the electronics portion to bring the primary sinusoidal component of each reflected sound wave into alignment with respect to the primary sinusoidal component of the other reflected sound waves; and producing the data output based upon the reflected sound waves using the electronics portion.

11. The method of claim 10, wherein the data output comprises a distance from the acoustic position measurement system to the boundary formation.

12. The method of claim 10, further comprising communicating the data output to a surface device using a transmitter.

13. The method of claim 10, wherein processing the reflected sound wave comprises amplifying the reflected sound wave using an amplifier coupled to the acoustic receiver.

14. The method of claim 13, further comprising activating the amplifier at a specified time and for a specified duration after transmission of the sound wave using a timer.

15. The method of claim 10, further comprising combining the reflected sound waves to generate a signal, wherein the data output is based on the signal.

16. The method of claim 15, further comprising filtering the signal to block out-of-band sound waves using a band pass filter.

17. The method of claim 10, further comprising detecting a directional position of the acoustic position measurement system using a directional sensor, wherein the data output comprises the directional position and a distance from the acoustic position measurement system to the boundary formation and an indication if the system is within a specified range of the boundary formation.

18. The method of claim 10, wherein a density ratio between the boundary formation and the target formation is approximately 2:1.

* * * * *